United States Patent [19]
Torii et al.

[11] Patent Number: 5,676,217
[45] Date of Patent: Oct. 14, 1997

[54] METHOD AND SYSTEM FOR DETECTING ABNORMALITY OF VEHICLE CONSTANT SPEED TRAVEL CONTROL

[75] Inventors: Yoshinari Torii, Gamagouri; Yasuhiko Sato, Nukata-gun, both of Japan

[73] Assignee: Nippondenso Co., Ltd., Kariya, Japan

[21] Appl. No.: 548,860

[22] Filed: Oct. 26, 1995

[30] Foreign Application Priority Data

Oct. 27, 1994 [JP] Japan ................. 6-264153

[51] Int. Cl.⁶ ............................................. B60K 31/00
[52] U.S. Cl. .................. 180/179; 180/171; 364/426.041; 364/431.07
[58] Field of Search ..................... 180/170, 171, 180/178, 179; 364/431.07, 426.041

[56] References Cited

U.S. PATENT DOCUMENTS

| | | | |
|---|---|---|---|
| 4,372,265 | 2/1983 | Kasiewicz | 180/179 |
| 4,921,063 | 5/1990 | Masuda | 180/178 |
| 4,991,100 | 2/1991 | Matsui | 364/426.04 |
| 5,001,944 | 3/1991 | Ogawa et al. | 180/179 |
| 5,014,201 | 5/1991 | Tsukahara et al. | 180/170 |
| 5,125,471 | 6/1992 | Iwaoka et al. | 180/170 |

FOREIGN PATENT DOCUMENTS

| | | | |
|---|---|---|---|
| 60-215433 | 10/1985 | Japan | 180/179 |
| 61-291225 | 12/1986 | Japan | 180/178 |
| 62-289438 | 12/1987 | Japan | 180/175 |
| 63-180528 | 7/1988 | Japan | |
| 321524 | 1/1991 | Japan | 180/178 |
| 4-121233 | 4/1992 | Japan | |
| 6-146977 | 5/1994 | Japan | |
| 6-249040 | 9/1994 | Japan | |

Primary Examiner—Brian L. Johnson
Assistant Examiner—Gary Savitt
Attorney, Agent, or Firm—Cushman, Darby & Cushman IP Group of Pillsbury Madison & Sutro LLP

[57] ABSTRACT

A constant speed travel control system uses a time period Q which is set such that, if a motor of the actuator is not locked but normally rotated, actuator opening becomes almost certainly fully closed within that time period with the result that a first limit switch is made open. If the motor is normal, the processing operation proceeds to a normal constant speed travel control by which an electric current to the motor ceases and "motor open" condition is detected. When no "motor open" state is detected, even after the elapse of the time period Q, under the condition that the vehicle speed is higher than a reference speed, a determination that the motor is in the locked condition is made and the operation proceeds to a speed control cancellation process.

24 Claims, 10 Drawing Sheets

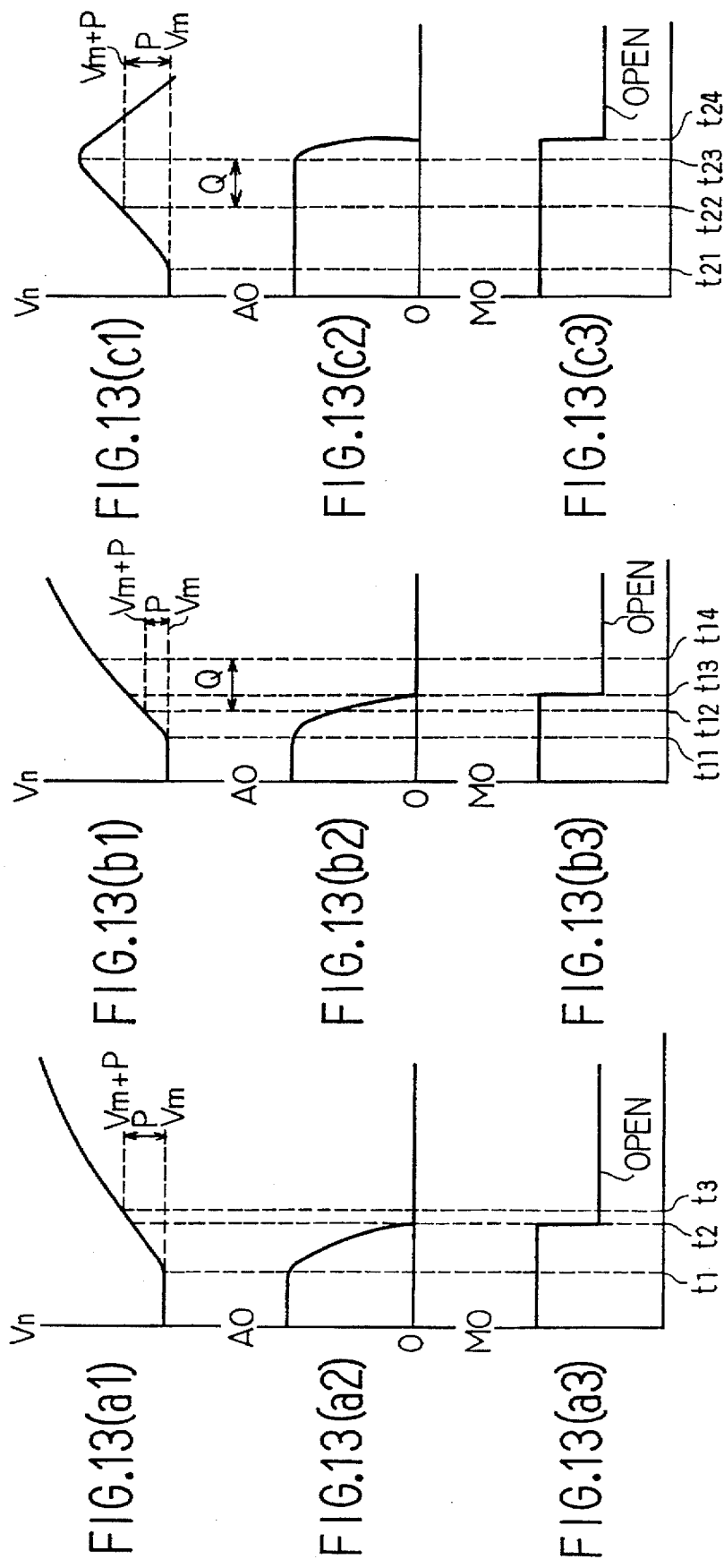

FIG. 14 (a) VEHICLE SPEED 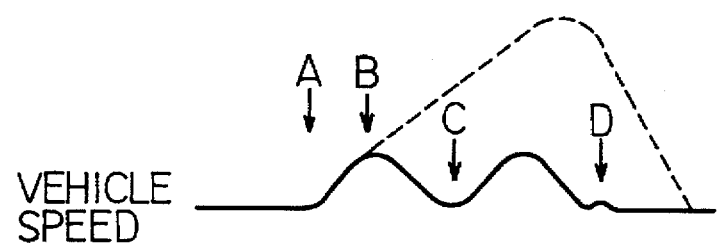
FIG. 14 (b) THROTTLE OPENING 
FIG. 14 (c) IDLE SWITCH 
FIG. 15 (a) VEHICLE SPEED 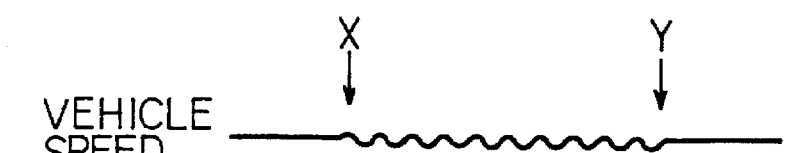
FIG. 15 (b) THROTTLE OPENING 
FIG. 15 (c) IDLE SWITCH 

METHOD AND SYSTEM FOR DETECTING ABNORMALITY OF VEHICLE CONSTANT SPEED TRAVEL CONTROL

CROSS REFERENCE TO RELATED APPLICATION

This application is based on and claims priority of Japanese Patent Application No. 6-264153, filed on Oct. 27, 1994, the content of which is incorporated herein by reference.

BACKGROUND OF THE INVENTION

1. Field of the Invention

The present invention relates to a method and system for detecting an abnormality such as an unrotatable state or locked state of a motor driving an engine drive force control mechanism such as a throttle valve, etc. during constant speed travel control operation.

2. Description of Related Art

A constant speed travel control system for a vehicle so operates that when a driver depresses an accelerator pedal to accelerate the vehicle up to a desired vehicle speed and thereafter operates a vehicle speed setting switch for travel at a constant speed, the vehicle speed at that time is set as a vehicle speed for constant speed travel. Thereafter, control is performed so that, for example, a throttle opening is controlled so as to reduce a difference between the present vehicle speed and the set vehicle speed to thereby cause the vehicle to automatically travel at the constant speed. In a vehicle equipped with this system, where travel on an expressway is made at a constant speed, it is always unnecessary to depress the accelerator pedal, so that very high convenience is realized.

However, if, when the vehicle is under the above-mentioned constant speed travel control, a motor for rotating the throttle valve and thereby controlling the throttle opening becomes unrotatable or uncontrollable, i.e. has become locked, constant speed travel control becomes impossible to perform.

The motor lock may be caused in the motor itself or by a throttle valve lock or lock of a connecting member between the motor and the throttle valve. Further, the constant speed travel control may become inoperative because of other causes than the motor lock.

In order to detect the above-mentioned locked state of the motor, it is proposed to provide an expensive detector device such as a potentiometer, which detects the throttle opening (hereinafter referred to as "actuator opening") changed by the motor, observes changes in the detected value, and, when changes have ceased to occur, to determine that the motor is in a locked state. By providing such a detector device, post-lock countermeasures such as, for example, cancellation of the constant speed travel control, etc. can be taken.

However, in a system where no use is made of the above-mentioned potentiometer or the like, since the actuator opening cannot be detected, it is impossible to determine the locked state of the motor by the above-mentioned method.

SUMMARY OF THE INVENTION

The present invention has been made in view of the above-mentioned problems, and an object of the present invention is to provide a method and a system for detecting an abnormality of a constant speed travel control system for a vehicle without detecting the actuator opening.

In a system for detecting an abnormality of a constant speed travel control system including a motor lock during a constant speed travel control operation according to the present invention, when it is determined that the speed of the vehicle is higher than a reference speed, the motor is forcedly rotated so as to control a drive force control mechanism to a minimum value. Since the speed of the vehicle at this time is higher than the reference speed which may be a speed corresponding to the sum of a target travel speed and a prescribed speed, the driving, force controlling mechanism should be driven by the constant speed travel control so that the value thereof is controlled to be minimum. Therefore, no adverse effect is had on the constant speed travel control.

If, when the driving force controlling mechanism is controlled so that the value thereof becomes minimum, as mentioned above, the motor is not in an unrotatable state, electric current input to the motor should be cut off. Also, if the motor is in an unrotatable state, electric current should continue to flow into the motor through the operation of the driving force minimization control.

Accordingly, when the presence of electric current is still being detected even after the time period in which it is continually determined that the speed of the vehicle is higher than the reference value for more than a prescribed time period, it can be determined that the motor is in an unrotatable state.

If the engine is an internal combustion engine, it is possible to adopt, for example, a throttle valve as the driving force controlling mechanism.

In addition, when it has been determined that the motor is in an unrotatable state, the constant speed travel control can be cancelled to terminate the constant speed travel control with safety.

Further, when it has been determined that the motor is in an unrotatable state, an alarm may be generated to inform a driver that the performance of a constant speed travel control has become difficult due to failure of rotation of the motor, or that the constant speed travel control has been cancelled, thereby making it possible for him to take appropriate action.

Further, when it has been determined that the motor is in an unrotatable state, the determination that the motor has been unrotatable may be stored to make it known that the abnormality that the motor has been in an unrotatable state has occurred. Thus, at a later time when inspection is performed due to some stored information of abnormality, or at a periodic-inspection time, it becomes possible to perform a more appropriate and efficient repair.

Further, when it has been determined that the motor is in an unrotatable state, a power source for the performance of a constant speed travel control may be interrupted to ensure safe termination of the constant speed travel control.

BRIEF DESCRIPTION OF THE ACCOMPANYING DRAWINGS

FIGS. 13(a1) to 13(c3) are timing charts of the motor lock detection process, illustrating a case where no motor lock is detected and a case where motor lock is detected;

FIGS. 14(a) to 14(c) presents timing charts illustrating respective states of a vehicle speed, throttle opening, and idle switch during travel on a sharply descending sloping road in the case where both a map G1 and a map G2 are used; and FIGS. 15(a) to 15(c) are timing charts illustrating respective states of a vehicle speed, throttle opening, and idle switch during travel on a sharply descending sloping road in the case where only the map G1 is used.

DETAILED DESCRIPTION OF THE PREFERRED EMBODIMENT

An embodiment of the present invention, which detects abnormality of a constant speed travel control mechanism such as locking of a motor, will now be explained in detail with reference to the accompanying drawings.

Figure 1:
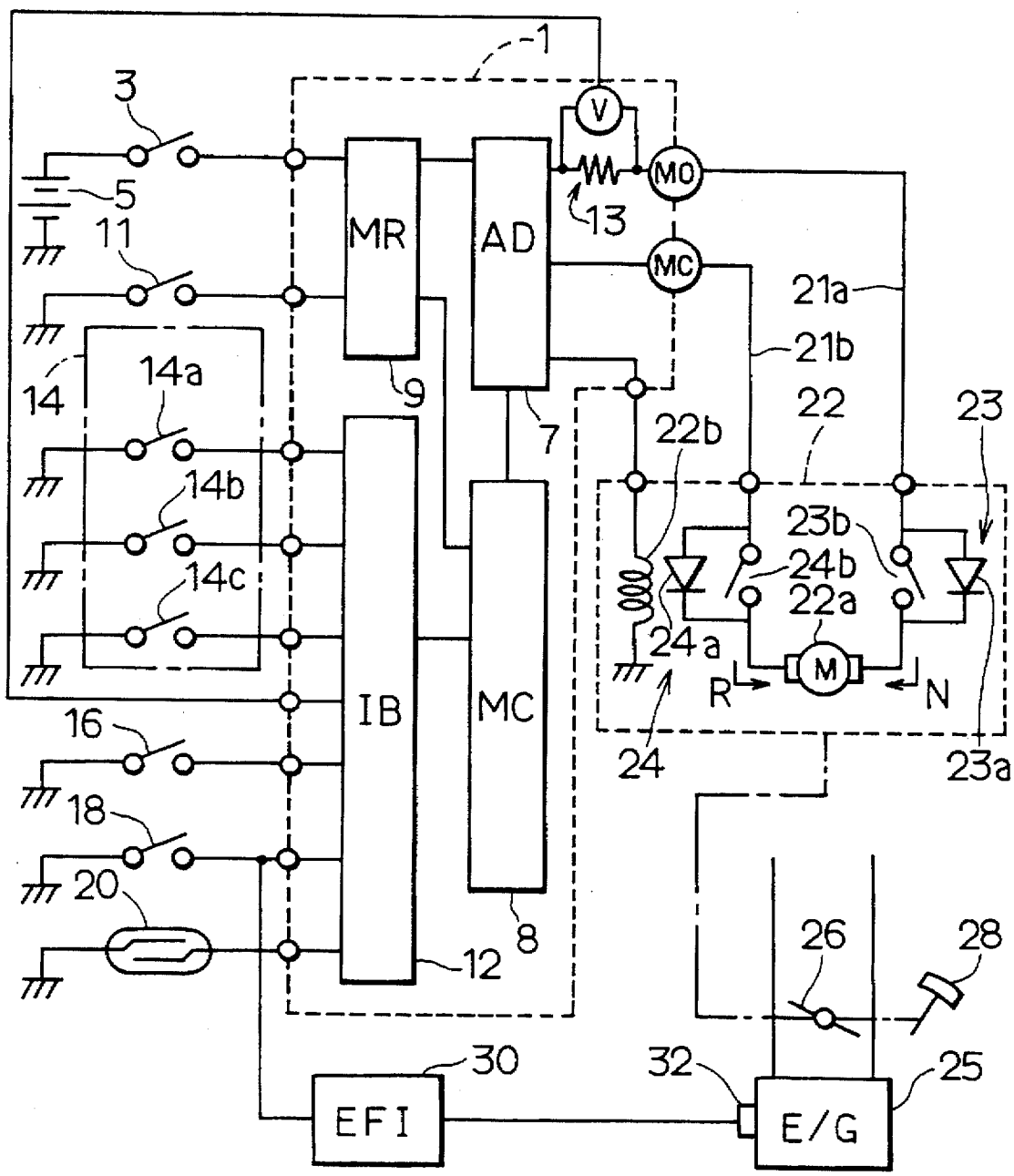
FIG. 1 is a diagram illustrating the overall construction of a constant speed travel control system according to an embodiment of the present invention.

FIG. 1 is an electric wiring diagram illustrating the entire construction of a constant speed travel control system according to an embodiment of the present invention. This constant speed travel control system is fitted to an automobile having a gasoline engine (E/G) 25 together with an electronic control fuel injection device (EFI) 30.

To an electronic control unit for a cruise control, ECU 1 for performing a constant speed travel control operation there is connected a battery 5 via an ignition switch 3. Upon an on-operation of this ignition switch 3, an electric current is supplied to the cruise ECU 1, whereby a microcomputer (MC) 8 can operate. Also, an electric current is supplied via a main relay (MR) 9 to an actuator driving stage (AD) 7 contained in the cruise ECU 1. To this main relay 9 there is connected a main switch 11 for a constant speed travel control. Upon an on-operation of this main switch 11, the main relay 9 is turned on with the result that an electric current is supplied to the actuator driving stage 7 which thus becomes able to operate.

The microcomputer 8 is constructed as an ordinary microcomputer equipped with ROM, RAM, I/O, bus lines and the like. To the microcomputer 8 there are inputted signals from various sensors and switches via an input buffer (IB) 12. In this embodiment, the microcomputer 8 inputs signals from an electric current sensor 13, control switches 14 for a constant speed travel control, a stop lamp switch 16 which is turned on when a driver has depressed a brake pedal, an idle switch 18 which is turned on when the throttle valve is fully closed, and a vehicle speed sensor (vehicle speed detecting means) 20 which generates a signal having a frequency proportional to the travelling speed of the automobile.

The control switches 14 include a set switch 14a, a resume switch 14b, and a cancellation switch 14c. Each of the set switch 14a, resume switch 14b, and cancellation switch 14c is of a type being turned on by a depression and immediately turned off by having its depression released.

The microcomputer 8 sequentially executes the program commands stored in its ROM according to the signals from the above-mentioned sensors and switches, and, as the necessity arises, outputs a drive instruction signal to the actuator driving stage 7.

The actuator driving stage 7 is a drive circuit for driving an actuator 22. It generates a drive output signal corresponding to a drive instruction from the microcomputer 8 to a motor 22a and a clutch 22b, both of which are contained in the actuator 22. For example, as regards the motor 22a, normal and reverse rotations and the number of such rotations are controlled by the output signal from the actuator driving stage 7. Further, when electric current is supplied to the clutch 22b by the output signal from the actuator driving stage 7, the rotation of the motor 22a is transmitted to a throttle valve 26 of the engine 25 via the clutch 22b and connection members such as a pivoting lever in the known manner. As a result of this, it is possible for the microcomputer 8 to control the driving force of the engine 25, whereby the speed of the vehicle can be controlled. The above-mentioned connection members and the throttle valve 26 are at all times urged by springs in directions in which the throttle valve 26 is fully closed.

On an electric current input path 21a on the normal rotation side of the motor 22a there are provided a first diode 23a having the current direction causing the normal rotation of the motor 22a and a first limit switch 23b which is arranged in parallel to the first diode 23a and which is made open in interlocking relation with the locked position of the connection members adjusted to a minimum value of the actuator opening, namely full closure of the throttle valve. Further, on an electric current input path 21b on the reverse rotation side of the motor 22a there are provided a second diode 24a having the current direction causing the reverse rotation of the motor 22a and a second limit switch 24b which is arranged in parallel to the second diode 24a and which is made open in interlocking relation with the locked position of the connection members adjusted to a maximum value of the actuator opening (minimum driving force state or minimum power transmission state), namely a fully opened state of the throttle valve. When electric current is caused to flow from a normal rotation side terminal N to a reverse rotation side terminal R by the operation of the actuator driving stage 7, electric current flows in the motor 22a from the electric current input path 21a via the first diode 23a or the first limit switch 23b. As a result, the motor 22a makes its normal or forward rotation to thereby change the actuator opening causing the operation of the clutch 22b and the connection members such as the pivoting lever in the direction in which the actuator opening becomes large. If at this time the clutch 22b is in a state of connection, the throttle valve 26 is rotated to a side wherein it is opened. When the connection members reach their positions at which the throttle valve 26 is fully opened, the second limit switch 24b is made open by the connection members. For this reason, electric current to the motor 22a is cut off, with the result that the rotation of the motor 22a is stopped, thereby preventing unnecessary supply of electric current. Conversely, when electric current is caused to flow from the reverse rotation side terminal R to the normal rotation side terminal N by the operation of the actuator driving stage 7, electric current flows from the electric current input path 21b to the motor 22a via the second diode 24a or the second limit switch 24b. As a result, the motor 22a makes its reverse rotation to thereby change the actuator opening causing the operation of the clutch 22b and the connection members such as a pivoting lever in the direction in which the actuator opening becomes small. If at this time the clutch 22b is in a state of connection, the throttle valve 26 is rotated to a side wherein it is closed. When the connection members reach their positions at which the throttle valve is fully closed, the first limit switch 23b is made open by those connection members. For this reason, electric current to the motor 22a is cut off, with the result that the rotation of the motor 22a is stopped, thereby preventing unnecessary supply of electric current.

As mentioned above, even when the actuator driving stage 7 attempts to supply electric current to the motor 22a during a time period in which the actuator opening is fully opened or fully closed, no electric current flows in the motor 22a because the second limit switch 24b or the first limit switch 23b is made open. That is, a state wherein no electric current flowing therethrough is detected by the electric current sensor 13. Accordingly, by checking a state of detection of the electric current sensor 13 when the actuator driving stage 7 is driving the motor 22a, it can be confirmed that the actuator opening has been fully closed or fully opened if no electric current is detected.

Also, as a well known construction, an accelerator pedal 28 is connected to the throttle valve 26 so that the amount of depression thereof may be interlocked with the throttle opening. While the depression operation of the accelerator pedal 28 and the rotation operation of the motor 22a connected to the throttle valve 26 by the clutch 22b can be performed independently from each other, of the operations the one increasing the throttle opening causes the rotation of the throttle valve 26. Accordingly, even when the motor 22a is rotating so as to cause the throttle valve 26 to be fully closed, namely even when the actuator opening is being fully closed, the throttle opening increases up to a value corresponding to the amount of depression of the accelerator pedal 28 if this accelerator pedal 28 is being depressed. Conversely, even when the accelerator pedal 28 is not depressed, the throttle opening increases up to a value corresponding to the rotation of the motor 22a, namely a value corresponding to the actuator opening if the motor 22a is rotating in such a direction as to open the throttle valve 26 and if the actuator opening is not in a state of being fully closed. Because this construction is well known, a detailed description thereof will be omitted for brevity.

The automobile is equipped with the electronic control fuel injection device 30 in addition to the above-mentioned constant speed travel control system. This electronic control fuel injection device 30 calculates a necessary amount of fuel in corresponding relation to load, etc. of an engine 25 and supplies the fuel from an injector 32 into intake air. Also, the electronic control fuel injection device 30 performs fuel cut-off control under prescribed conditions for fuel cut-off, under the conditions that the idle switch 18 is turned on during travel and this "on" state continues for a prescribed time period (e.g. 500 msec).

Next, an explanation of the constant speed travel control process performed by the microcomputer 8 will be made with reference to flow charts, etc. of FIG. 2 and its succeeding figures.

Figure 2:
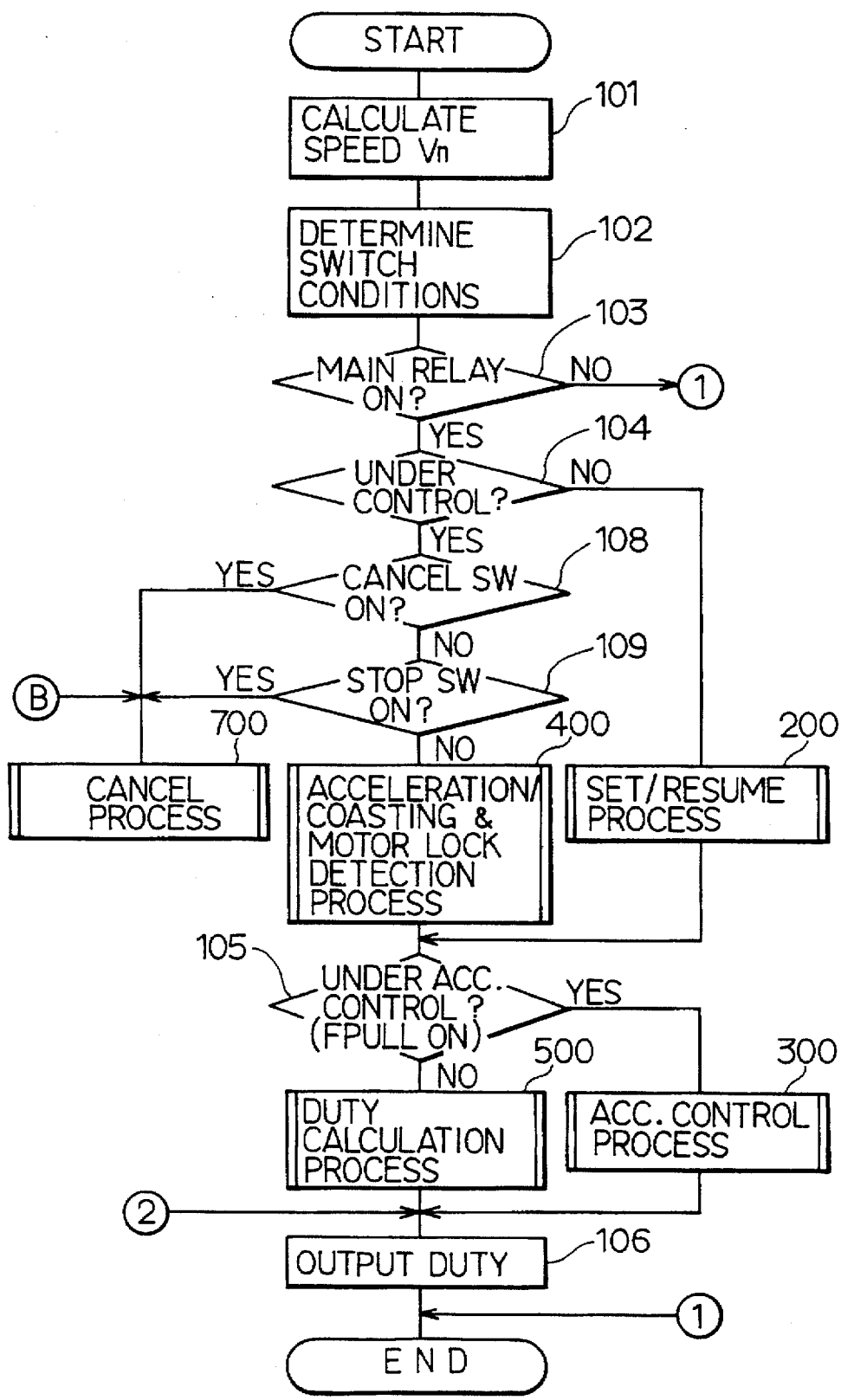
FIG. 2 is a flow chart illustrating a constant speed travel control process performed by the constant speed travel control system.

When electric current is supplied to the microcomputer 8 of the cruise ECU 1 upon on-operation of the ignition switch 3, the constant speed travel control process illustrated in FIG. 2 is performed in units of a control period T (e.g. 48 msec). In this constant speed travel control process, an output duty (%) is determined from a calculated vehicle speed, switch inputs, etc. and electric current is supplied to the motor 22 of the actuator 22a for a time period of T×duty/100.

Firstly, the period of a signal from the vehicle speed sensor 20 is read in and calculation is performed of the present vehicle speed (vehicle speed: Vn) (step 101). Next, an on/off determination is made of each of respective switch signals from the control switch 14, stop lamp switch 16, and idle switch 18 (step 102). Next, an "on" determination is made of the main relay 9 (step 103). This process step is for, when the main relay 9 is not in an "on" state, preventing the shift to the constant speed travel control because of no electric current being supplied to the actuator driving stage 7. When the main relay 9 is not in an "on" state, the control period is terminated without performing any processing such as duty calculation, etc., the operation of the microcomputer being placed in standby until a next control period begins.

If the main relay 9 is in an "on" state, then it is next determined whether or not the constant speed travel control process is being performed (step 104). The kind of a control executed on the basis of a signal input from the control switch 14 is determined after the performance of this process.

If it is determined in step 104 that the constant speed travel control is not being performed, a set/resume process (step 200) is next executed. This process is for determining the setting of the constant speed travel control. The "setting" means to depress the set switch 14a when the constant speed travel control is not being performed and thereby cause the vehicle speed Vn at this time to be input, and to set this vehicle speed Vn to be a target vehicle speed Vt and a stored vehicle speed Vm to thereby cause the performance of the constant speed travel control. The resume process will be explained later.

Figure 3:
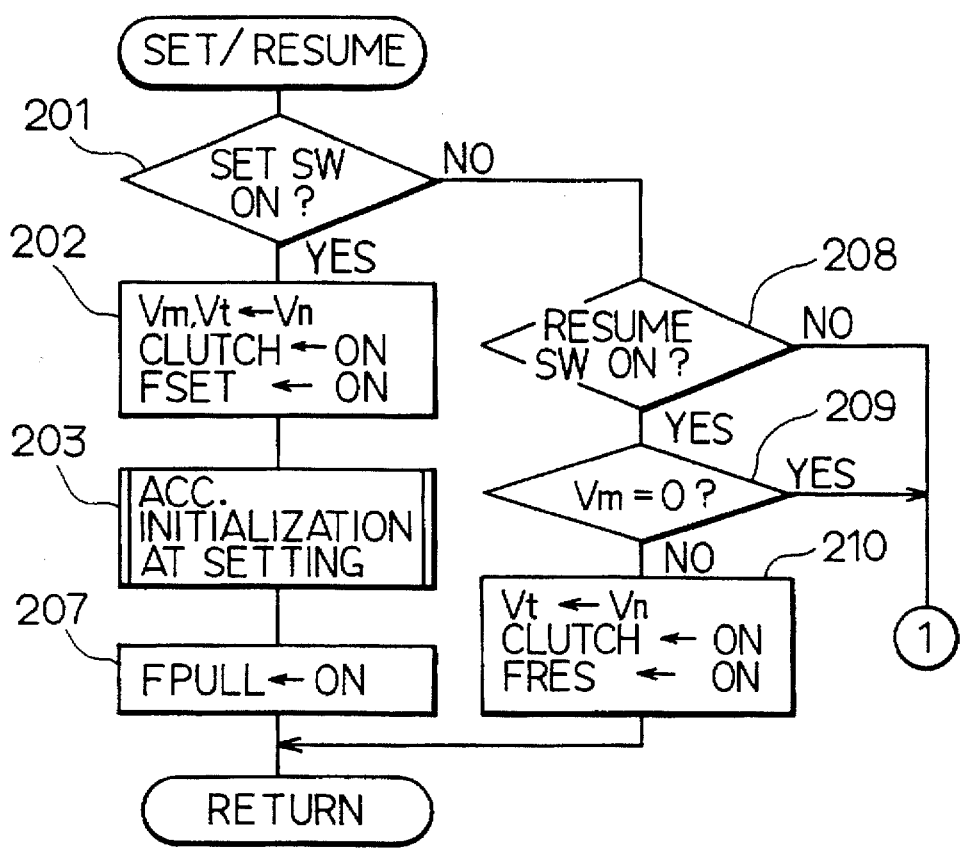
FIG. 3 is a flow chart illustrating a set/resume process in the constant speed travel control process.

Details of the set/resume process (step 200) are shown in FIG. 3. Firstly, an "on" determination of the switch 14a is performed (step 201). If the set switch 14a is in an "on" state, the vehicle speed Vn calculated in step 101 is set as the target speed Vt and the stored vehicle speed Vm. Further, the clutch 22b is made "on" so as to cause the rotation of the motor 22a to interlock with the throttle valve 26. Further, a set flag FSET is made "on" (step 202). Furthermore, an acceleration or revving control initialization (step 203) is performed for preventing a decrease in the vehicle speed at the setting time.

The "decrease in the vehicle speed which occurs at the setting time" means that while immediately after the performance of the setting the motor 22a of the actuator 22 is usually located at a position corresponding to the fully closed state of the throttle valve 26, a time lag occurs for the motor 22a to rotate from this position to a position corresponding to a throttle opening enabling the constant speed travel and during this time lag the vehicle speed decreases temporarily. To prevent this, immediately after the setting, the motor 22a of the actuator 22 is temporarily driven toward the side where the throttle valve is opened for engine acceleration. Calculating the amount of this driving is a setting-time acceleration initialization process (step 203).

Figure 5:
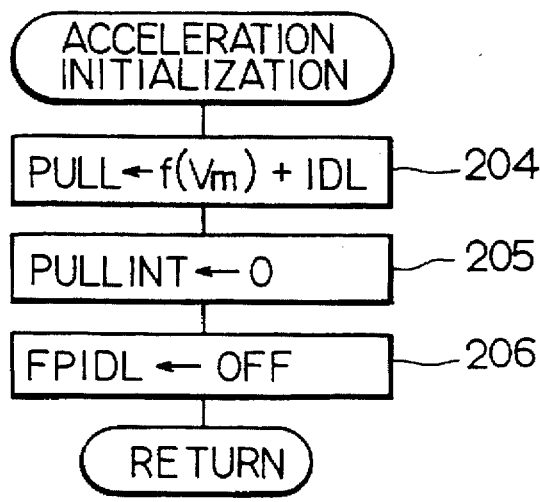
FIG. 5 is a flow chart illustrating an acceleration initialization process at the time of speed setting in the constant speed travel control process.

A detailed flowchart of the setting-time acceleration initialization process (step 203) is illustrated in FIG. 5. Firstly, the amount PULL of the motor 22a driven toward the opened side (this amount PULL corresponds to the frequency of repetitions in the constant speed travel control process) is calculated as the sum of an amount f(Vm) determined as a function of the stored vehicle speed Vm and a prescribed value IDL, as shown in the following expression 1 (step 204).

$$PULL \leftarrow f(Vm)+IDL \qquad \text{(Expression 1)}$$

where the prescribed value IDL is the total amount of idle of the link system of the actuator 22, the link system of the throttle valve, etc.

Next, an amount PULLINT described later is cleared to zero (step 205). Further, a flag FPIDL described later is made "off" (step 206), whereupon the setting-time acceleration initialization process (step 203) is terminated. Next, the flag FPULL which indicates that the acceleration control is being performed is made "on" (step 207). Accordingly, the next determination of whether or not the acceleration control is being performed, i.e., the "on" determination of the flag FPULL (step 105) is made such that the result thereof is YES, whereby the acceleration control (step 300) is executed.

Figure 6:
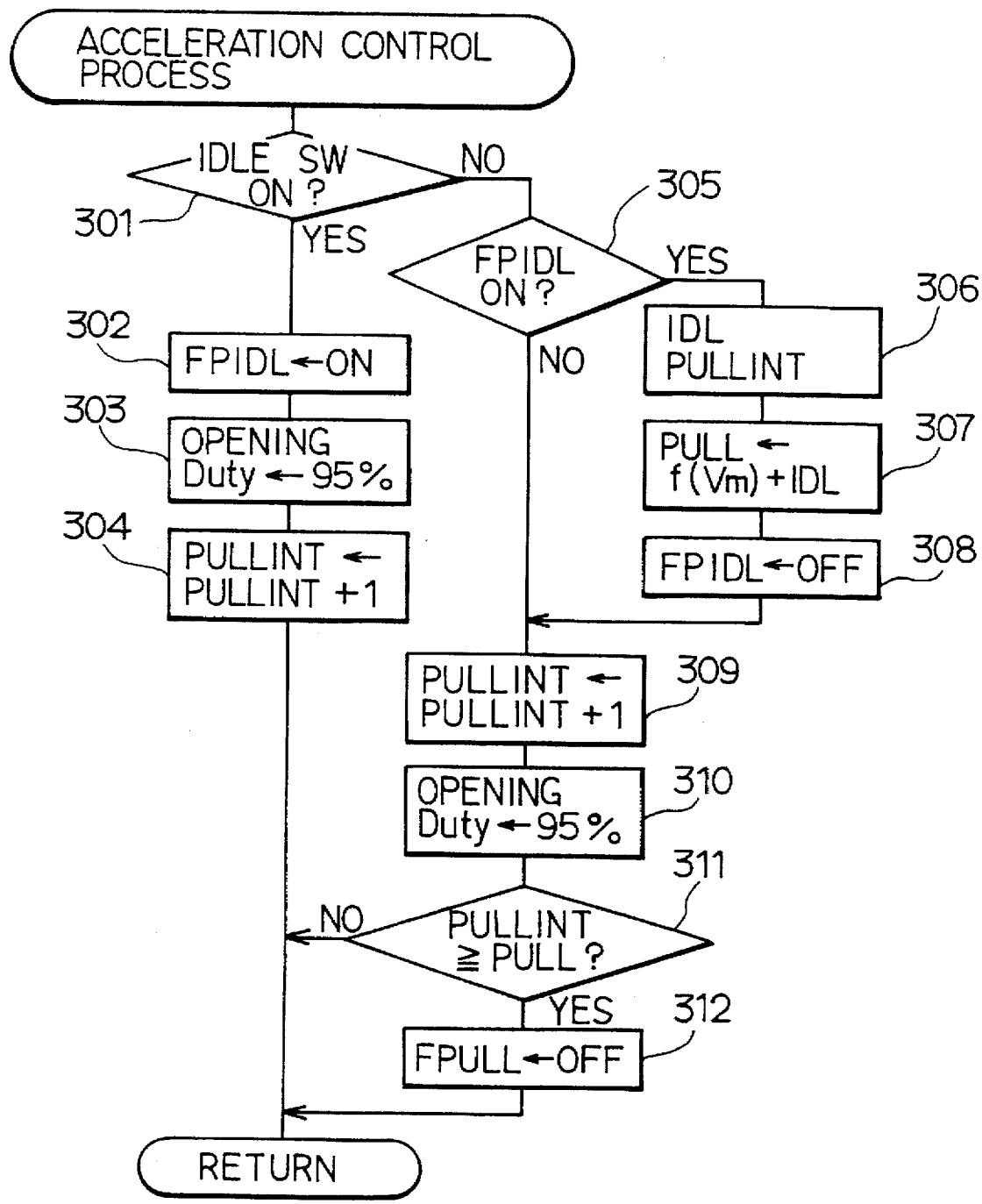
FIG. 6 is a flow chart illustrating an acceleration control process in the constant speed travel control process.

Details of the acceleration control process are illustrated in FIG. 6. That the idle switch 18 is "on" when initial setting has been performed in step 200 means that the present opening resulting from the motor 22a of the actuator 22 corresponds to the position of play thereof and that, therefore, the throttle valve 26 is at its fully closed position.

Accordingly, firstly, the "on" determination of the idle switch 18 is performed (step 301), and if the result thereof is YES, the flag FPIDL which indicates that the "on" state of the idle switch 18 has been detected during the acceleration control is made "on" (step 302). Next, a fixed duty (e.g., duty 95% as the high speed driving duty) is used as an output duty so that the actuator 22 drives the throttle valve 26 with a high speed to the side where it is opened. At this time, the frequency of the outputted fixed duty signals is counted by a counter PULLINT (step 304). Accordingly, in the duty output process (step 106), for example, the motor 22a is rotated with a high speed by the 95% duty signal to its side where the throttle valve is opened. Thereby, the rotation of the motor 22a corresponding to the idle is quickly eliminated.

When the constant speed travel control process is again started from step 101 at the next control period, the operations in steps 102 and 103 are performed and, in step 104, the determination "YES" is made because the constant speed travel control is being executed. Then, the "on" determination of the cancellation switch 14c (step 108) and the stop lamp switch 16 (step 109) are made. Since the both switches are made "off", the determination of "NO" is made, whereupon the operation proceeds to the accelerate/coasting and motor lock detection processes (step 400).

Figure 4:
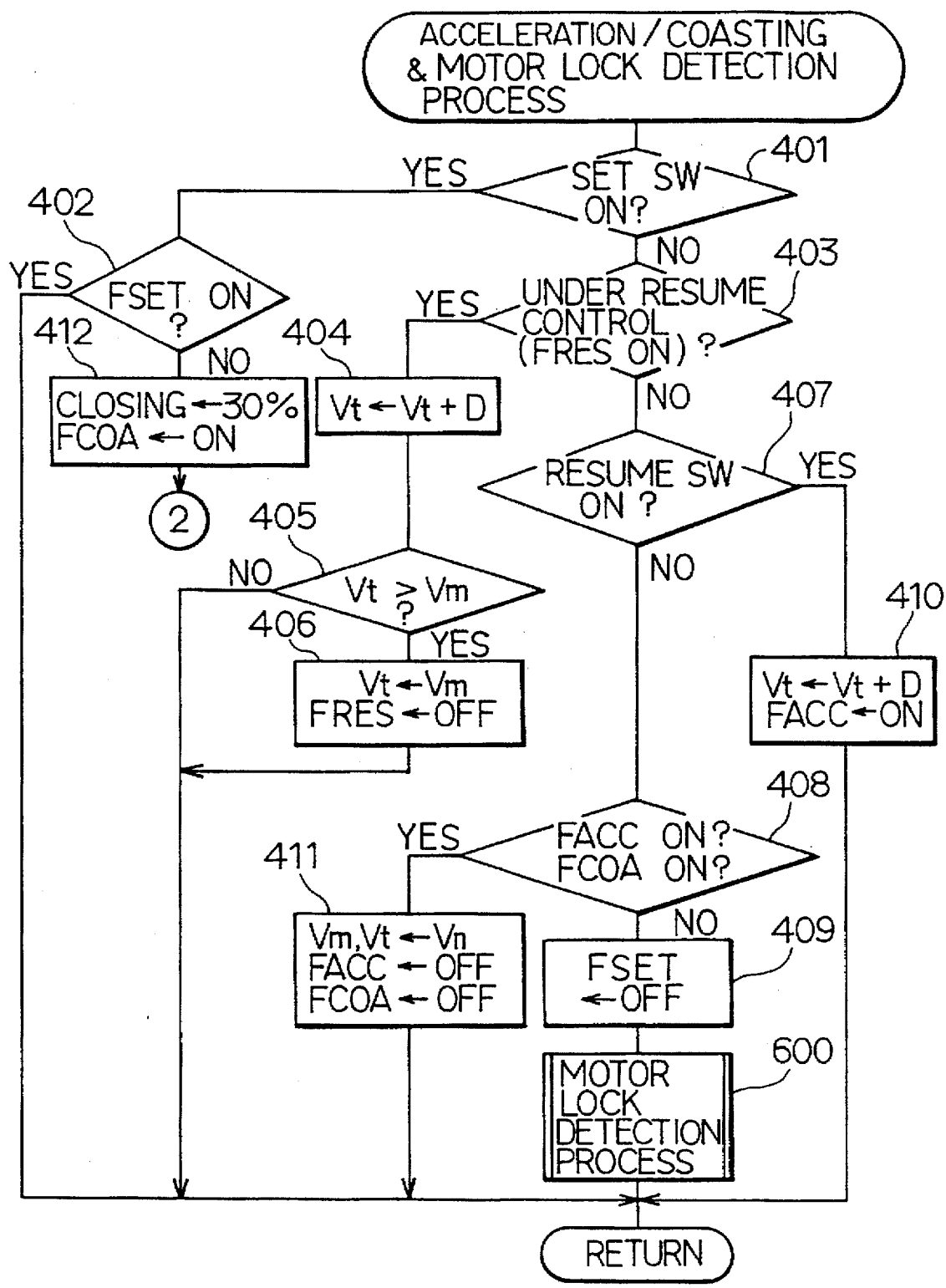
FIG. 4 is a flow chart illustrating an accelerating/coasting process and a motor lock detection process in the constant speed travel control process.

Details of the accelerating/coasting process and motor lock detection process (step 400) are illustrated in FIG. 4. Firstly, the "on" determination of the set switch 14a (step 401) is performed. Even if at this time the set switch is "on" the "on" determination of the set flag FSET is next performed (step 402). Since in step 202 of the set/resume process the set flag FSET is already made "on", in "on" determination a determination of "YES" is made with the result that the operation gets out of the process step 400 and the determination in step 105 is performed. Since the flag FPULL is still in an "on" state, the process in step 300 is again executed. Also, if in step 401 the set switch 14a is not depressed, the determination of "NO" is made and then in step 403 it is determined whether or not the resume control as later described is being executed. Thus, the "on" determination of the resume switch 14b is performed in step 407 and also the "on" determinations of the flags FACC and FCOA are performed in step 408. In both determinations, the determination is "NO". Further, the flag FSET is made "off" (step 409) and in a subsequent step 600 the motor lock detection process described later is executed. So long as specific conditions are not established in this motor lock detection process, the operation then gets out of the process in step 400 and thus the determination in step 105 is done. Since the flag FPULL is still in the "on" state, the process in step 300 is again executed.

In the acceleration control process (step 300) in FIG. 6, as stated before, so long as the idle switch 18 is in the "on" state (step 301), the duty setting process (step 303) causing the throttle valve 26 to rotate with a high speed to the side of its being opened is performed for zeroing the play and realizing quickly a substantial degree of opening. The frequency of repetitions of this duty setting process is counted by the counter PULLINT (step 304).

Thereafter, when the idle switch 18 is turned off, the operation proceeds from step 301 to the "on" determination of the flag FPIDL (step 305). Since in the cyclic control period preceding the present one the flag FPIDL is made "on" in step 302, the value of the counter PULLINT which represents the frequency of the fixed duty signals having been outputted up to now is set as the variable (amount of idle) IDL which represents the amount of idle of the throttle valve 26 (step 306). Then, as shown in the following expression 2, the opened side drive amount PULL for acceleration control is again calculated based on the stored vehicle speed Vm and the idle amount IDL.

$$PULL \leftarrow f(Vm)+IDL \qquad \text{(Expression 2)}$$

Next, the flag FPIDL is made "off" (step 308), the counter PULLINT is counted up (step 309), the open-side duty is set to be 95% (step 310), and the "on" determination of PULLINT≧PULL is performed (step 311). Since the PULL is initially larger by <f(Vm)−1> than the PULLINT, the determination of "NO" is made in step 311 with the result that the operation proceeds to the next step 106 process in which the throttle valve 26 is controlled with a high speed to its opened side by use of the 95% duty. Accordingly, so long as PULLINT<PULL (specifically until PULLINT= PULL), the throttle valve 26 is rotated with a high speed to its opened side, whereby the throttle opening is rapidly increased. That is, the engine output is promptly increased for the purpose of realizing the stored vehicle speed Vm set in step 202 to thereby minimize a temporary decrease in the vehicle speed which occurs during a time period required until the actuator realizes a throttle opening capable of achieving the stored vehicle speed Vm.

When PULLINT has become equal to or larger than PULL through the counting-up operation of the counter PULLINT (step 309), the determination of "YES" is made in step 311 with the result that the flag FPULL is made off (step 312). As a result of this, in the next control period, the determination "NO" is made in step 105 with the result that a duty calculation process (step 500) is performed.

Figure 7:
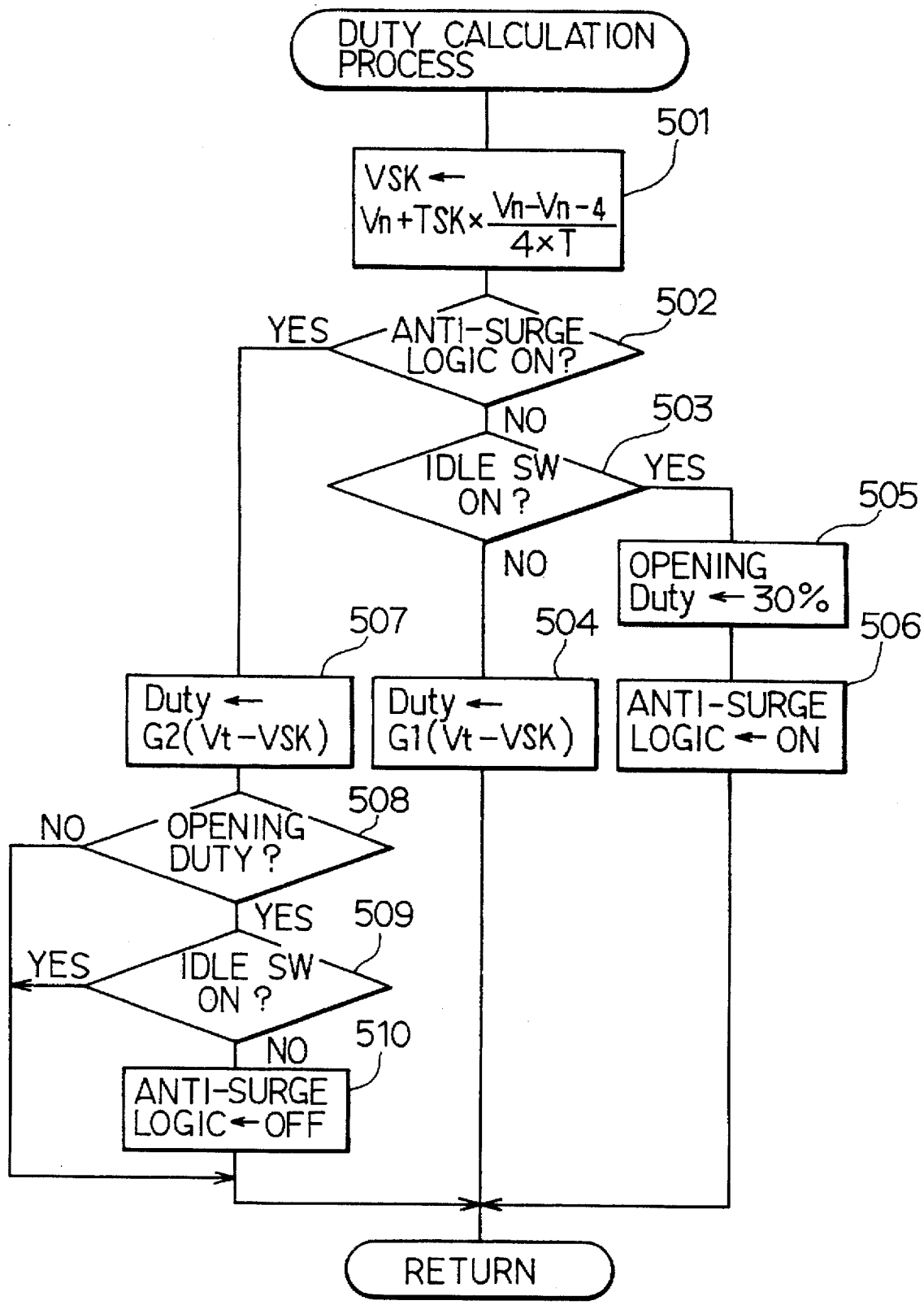
FIG. 7 is a flow chart illustrating a duty calculation process in the constant speed travel control process.
Figure 8:
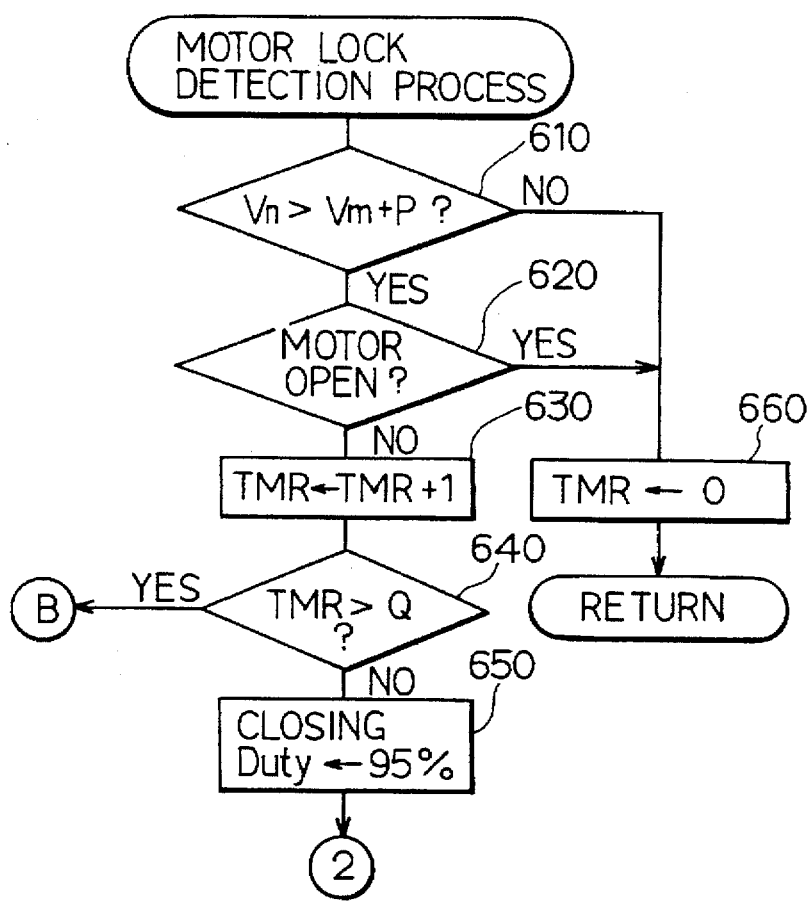
FIG. 8 is a flow chart illustrating a motor lock detection process.

Details of the duty calculation process (step 500) is illustrated in FIG. 7. Firstly, a skip vehicle speed (Vsk) which is an advance vehicle speed is determined based on the present vehicle speed Vn plus a value obtained by multiplying a skip time length Tsk by a vehicle speed difference value (which is actually determined by dividing by a 4-control-period length value a difference between the vehicle speed Vn and a vehicle speed Vn-4 in a control period that precedes by 4 control periods) as expressed in the following expression 3 (step 501).

$$Vsk \leftarrow Vn + Tsk \times (Vn - Vn-4)/4T \quad \text{(Expression 3)}$$

In other words, Vsk represents a value which is based on estimating a vehicle speed that would be arrived at after the skip time length Tsk.

Next, the "on" determination of an anti-surge logic process (step 502) is performed. Since the result thereof is initially that the logic process is "off", the "on" determination of the idle switch 18 is next performed (step 503). At a time other than a time immediately after entry into the constant speed travel control operation, the time when the idle switch 18 is turned on is a time when, during the constant speed travel control, the vehicle has advanced from a level road to a downhill road. The conditions under which the determination in step 503 is performed means are the conditions under which there is a high possibility that fuel cut-off is done in the electronic control fuel injection device 30. Of course, such conditions may also be those under which a fuel cut-off is done, namely that the "on" state of the idle switch 18 has continued for 500 msec.

Figure 11:
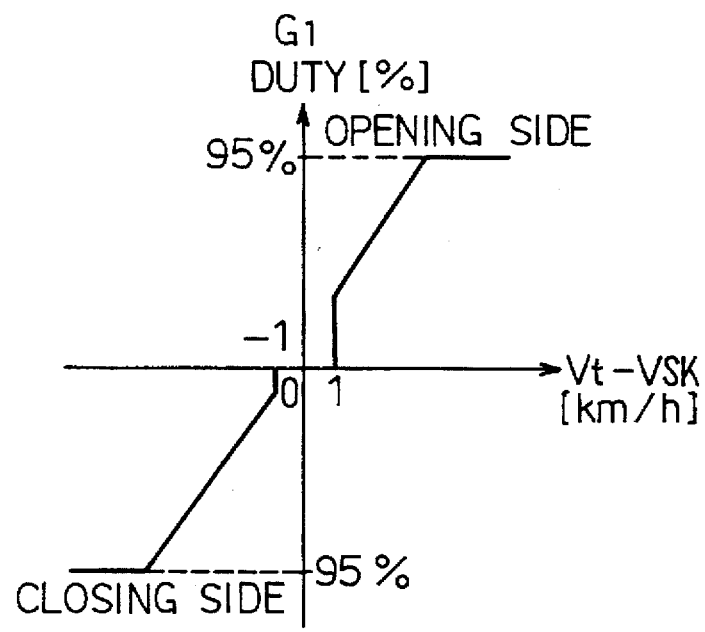
FIG. 11 is a map for calculating a duty from a deviation at a normal operation.

If the idle switch 18 is "off" because of a level road or the like, the operation proceeds to the process in step 504 where the duty value for driving the motor 22a is calculated, according to a map G1 illustrated in FIG. 11, from a deviation obtained by subtracting the skip vehicle speed from the target speed Vt (Vt−Vsk:km/h). The higher this duty is, the higher the rotation speed of the motor 22a. As a result, the throttle valve 26 is rotated with a high speed. This can be expressed as in the following expression 4.

$$DUTY \leftarrow G1 (Vt - Vsk) \quad \text{(Expression 4)}$$

In FIG. 11, the side where the throttle opening increases is plotted on the upper part of the abscissa while, on the other hand, the side where the throttle opening decreases is plotted on the lower part of the abscissa. The maximum duty on each side is set to be 95%. Also, a dead zone is provided in a deviation range of from +1 to −1. In this dead zone, the throttle opening is not changed by outputting a 0% duty signal to the motor 22a. This is to prevent the drive signal outputted to the motor 22a of the actuator 22 from becoming complex.

Since the map G1 is set as mentioned above, in a deviation range of (Vt−Vsk≧1) the output duty causing an increase in the throttle opening increases to 95% as this deviation increases. That is, the greater the deviation becomes, the more quickly the throttle opening becomes greater.

Also, in a deviation range of Vt−Vsk≦−1, the smaller the deviation becomes, the more the output duty causing a decrease in the throttle opening increases, to a maximum 95%. That is, the smaller the deviation becomes, the more quickly the throttle opening becomes smaller.

Thereafter, so long as the existing conditions are not changed, the processes in steps 101, 102, 103, 104, 108, 109, 401, 403, 407, 408, 409, 600, 105, 501, 502, 503, 504, and 106 are repeatedly executed in control-period units. That is, feedback control is executed so that the vehicle speed Vn becomes equal to the target speed Vt, with the result that constant speed travel control at the target speed is realized.

Even when from this state of travel the vehicle advances to a downhill road with the result that the throttle opening is gradually decreased, it becomes difficult to decrease the vehicle speed down to the target speed Vt. If as a result the idle switch 18 becomes turned on during the constant speed travel control operation, the determination of "YES" is made in step 503 with the result that the duty on the side of increasing the throttle opening is set to 30% (step 505). By this setting, the throttle is increased to some extent. The reason for this is as follows. If the "on" state of the idle switch 18 continues for a prescribed time period, fuel cut-off for reducing the fuel consumption rate is executed by the electronic control fuel injection device 30. Therefore, by increasing the throttle opening and thereby zeroing or stopping early the fuel cut-off, a rapid decrease in the vehicle speed is prevented to slightly enhance the driving feel of the vehicle while traveling.

Next, the anti-surge logic is made "on" (step 506). As a result of this "on" operation, in step 500 in each of the next and succeeding control periods, the determination "YES" is made in step 502 with the result that the duty for driving the motor 22a is calculated based on a map G2 illustrated in FIG. 12 from the deviation (Vt−Vsk:km/h) (step 507). The higher this duty is, the higher the rotation speed of the motor 22a is. Consequently, the throttle valve 26 is rotated with a high speed. This is the same as in the case of FIG. 11, and expressed as in the following expression 5.

$$DUTY \leftarrow G2(Vt - Vsk) \quad \text{(Expression 5)}$$

Figure 12:
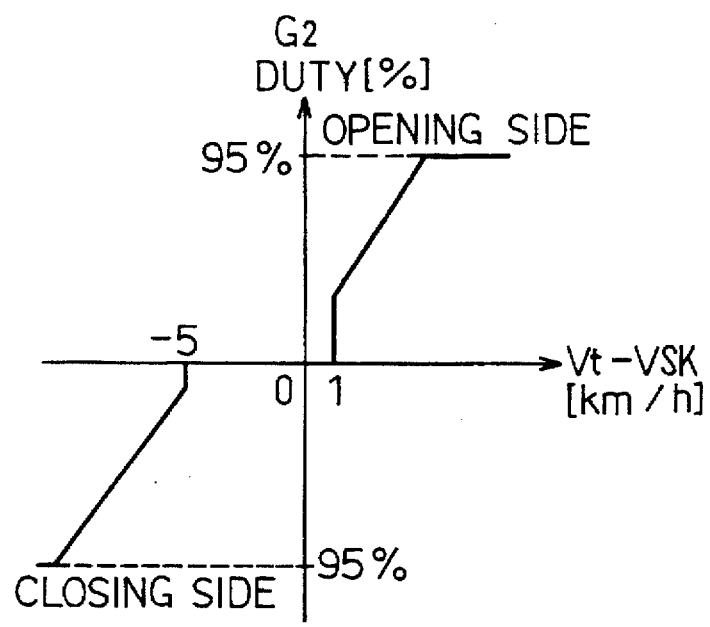
FIG. 12 is a map for calculating a duty from a deviation at a fuel cut-off time.

The map G2 of FIG. 12 differs from the map G1 of FIG. 11 in that the dead zone on the side of decreasing the throttle opening is widened. That is, although the dead zone on the side of increasing the throttle opening is smaller than 1 (km/h), the dead zone on the side of decreasing the throttle opening is provided in a deviation range of greater than −5 (h/h). This means that even when the vehicle speed Vn is somewhat higher than the target speed Vt, the throttle valve 26 is not rotated to the side of decreasing the throttle opening, meaning that on the side of decreasing the throttle opening, the timing of controlling the driving force by the throttle valve 26 is slowed by the extent to which the dead zone has been widened.

This anti-surge logic process is made "off" (step 510) when it has been determined that the result of the duty calculation in step 507 is on the side of increasing the throttle opening (step 508) and then it has been further determined that the idle switch 18 is "off" (step 509), with the result that the processing operation is again returned to the ordinary duty calculation in step 504.

As mentioned above, in this embodiment, if during the constant speed travel control operation the conditions under which there is a high possibility that a fuel cut-off is done (step 503) are not satisfied, the duty calculation is performed based on the use of the map G1 of FIG. 11. On the other hand, if the conditions under which there is a high possibility that a fuel cut-off is done (step 503) are satisfied, the duty calculation is performed based on the use of the map G2 of FIG. 12 wherein control of the throttle opening is slowed by the widened extent.

As a result of this, when the duty control has continued to be performed based only on the use of the map G1, a fuel cut-off surge wherein the vehicle speed fractionally changes between the points X and Y in time as in FIGS. 15(a) to 15(c) can be prevented. That is, as illustrated by solid lines in FIGS. 14(a) to 14(c), even when a fuel cut-off occurs during the "on" operation of the idle switch 18, the cyclic period of fluctuation in the vehicle speed Vn becomes longer with the result that degradation in the driving feel of the vehicle while traveling can be prevented. That is, even when at a point A in time the vehicle moves onto a downhill road whereby the conditions under which there is a high possibility that a fuel cut-off is done are satisfied, the throttle opening is immediately somewhat increased in step 505 and the idle switch 18 is made "off". Therefore, it is possible to prevent the electronic control fuel injection device 30 from actually starting its fuel cut-off processing operation. Accordingly, the vehicle speed does not immediately drop and increases. In addition, since on the minus side of the deviation (Vt–Vsk) control of the throttle opening toward the side where it is decreased is rendered ineffective by the widening of the dead zone and by this extent of widening, no change occurs in the throttle opening with the result that a rise in the vehicle speed Vn continues for a while. When at a point B in time the deviation (Vt–Vsk)≦–5 beyond the dead zone, the throttle valve is for the first time driven toward the side where the throttle opening is decreased. Then the idle switch 18 is turned on, whereby a fuel cut-off starts to be done and thus the vehicle speed Vn comes to decrease. Thereafter, when at a point C in time the deviation (Vt–Vsk)≧1, the throttle valve is driven toward the side where the throttle opening is increased. Then, the idle switch 18 is turned off and thus the fuel cut-off operation is ended with the result that the vehicle speed again rises. Thereafter, large periodic changes in the vehicle speed are repeated until a point D in time is reached when the downhill road terminates. As mentioned above, since the cyclic period of fluctuation in the vehicle speed which results from the fuel cut-off surge is large, the driving feel is not degraded. When after the passage of the point D in time the vehicle returns from the downhill road to a level road, the vehicle speed decreases with the result that the throttle opening is increased, the idle switch 18 is turned off, and the duty signal is outputted so that the motor 22a rotates in the direction in which the throttle valve is opened. Thus, the anti-surge logic process is terminated, whereby the processing operation returns to the ordinary control process.

Next, the motor lock detection process (step 600 in FIG. 4) will be explained. The motor lock detection process is intended for detecting a state wherein the motor 22a for controlling the actuator opening becomes unrotatable for some reason or other with the result that the actuator opening (the opening of the throttle valve 26 if the clutch 22b is "on") is uncontrollable.

Firstly, it is determined whether or not the vehicle speed Vn exceeds a speed (reference speed) obtained by adding a prescribed speed P (km/h) to the stored vehicle speed Vm (step 610). As this prescribed speed P, there is set, for example, a value (>1 km/h) which is somewhat greater than the difference between the target Speed Vt (or stored vehicle speed Vm) occurring at a downhill time and the actual vehicle speed Vn. If Vn≦Vm+P, the determination "NO" is made (step 610), whereupon the timer counter TMR is cleared to zero (step 660) and the operation gets out of the process in step 400, proceeding to the process in the next step 105. Accordingly, this state corresponds to the above-mentioned case where no specific conditions are established.

If in step 610 the condition (Vn>Vm+P) is satisfied, it is next determined whether or not a state "motor open" has been detected (step 620). The state "motor open" means that wherein the limit switches 23b, 24b are made open with the result that the energizing circuit is opened whereby no electric current is passing through the motor 22a. When the condition of Vn>Vm+P is met, usually, in the preceding constant speed travel control (step 500) the duty calculation process must have been executed based on the use of the map G1 of FIG. 11 or the map G2 of FIG. 12 whereupon in step 106 the duty on the side of closing the throttle valve 26 must be kept outputted. Accordingly, if the motor 22a is normal, it is considered that the actuator opening corresponds to a fully closed state wherein the throttle valve 26 is fully closed, or an intermediate state wherein the throttle valve is neither fully opened nor fully closed. Accordingly, if the actuator opening corresponds to such fully closed state, the determination "YES" is immediately made in step 620, with the result that the timer counter TMR is cleared to zero (step 660). Thus, the operation proceeds from step 400 to step 105, executing its ordinary process.

Also, if the actuator opening is directed midway to the side where the throttle valve 26 is fully closed, the determination "NO" is made in step 620 with the result that the timer counter TMR is counted up (step 630). Next, it is determined that the value of the timer counter TMR exceeds the value which corresponds to Q seconds (step 640). Since initially TMR<Q seconds, the determination of "NO" is made with the result that the 95% duty is set as the duty on the side of decreasing the actuator opening (step 650). Thereafter, the operation jumps over to step 106.

Accordingly, so long as Vn>Vm+P, the "motor open" state is not detected, and TMR≦Q seconds, the process in step 650 continues to be executed with the result that the output control of electric current is performed by the actuator driving stage 7 so that the actuator opening is rapidly fully closed, that is, so the motor 22a rotates at its maximum speed (95% duty).

If the motor 22a is not locked, with the result the motor 22 rotates just according to the output of the actuator driving stage 7, the actuator opening almost certainly becomes fully closed within a time period of Q seconds so that the first limit switch 23b becomes open. The value of Q is to realize this. For this reason, if the motor 22a is normal, no electric current becomes detected by the electric current sensor 13 at a time prior to the determination "YES" in step 640. As a result, the determination "YES" is made in step 620 as the "on" determination of "motor open" state. Then, the timer counter TMR is cleared to zero in step 660. Thus, the operation returns from step 400 to step 105, executing its ordinary process.

If the motor 22a is locked with the result that even when Q seconds elapse at the time of Vn>Vm+P, no "motor open" state is detected, the determination "YES" is made in step 640 and the operation proceeds to the cancellation process in step 700.

Next, the cancellation process will be explained. This cancellation process is that in step 700 which cancels the constant speed travel control process when the cancellation switch 14c of the control switch 14 has been depressed (step 108) during the constant speed travel control process, when the stop or brake lamp switch 16 has been turned on (step 109) by the depression of the brake pedal, or when the motor lock state has been detected (step 640).

Figure 9:
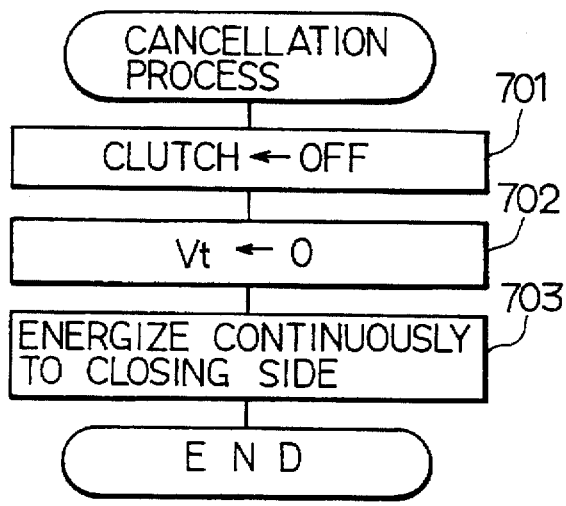
FIG. 9 is a flow chart illustrating a cancellation process in the motor lock detection process.

Details of the cancellation process are illustrated in FIG. 9. Firstly, the clutch 22b is made "off" (step 701), the target speed Vt is cleared to zero (step 702), the motor 22a is continuously energized to the side of closing the actuator opening (step 703), to thereby return the actuator opening to the fully closed state. At this time, the stored vehicle speed Vm is not cleared to zero but maintained as it is. If the motor 22a is locked, the motor 22a does not rotate in the process of step 703. However, since in step 701 the clutch 22b is made "off", no problem arises with controlling the opening of the throttle valve 26 by the accelerator pedal 28.

The above-mentioned prescribed speed P can be set as follows. Namely, this prescribed speed is set to be a value at which the deviation between the target speed Vt (or stored vehicle speed Vm) and the actual vehicle speed Vn becomes approximately a deviation less likely to occur during the ordinary constant speed travel control process. The reason for this is as follows. Where the prescribed speed P is set at approximately a deviation value very likely to occur during the ordinary constant speed travel control process, there occurs the inconvenience that when the deviation becomes such a deviation during the constant speed travel control process, the actuator is driven so that the throttle valve 26 may become fully closed as mentioned above. As a result, torque fluctuations occur with the result that the vehicle speed fluctuates largely to give a feeling of discomfort to the passengers. In the normal constant speed travel control process, the deviation between the target speed Vt and the actual vehicle speed Vn can be controlled to approximately a prescribed deviation (e.g., ±1 km/h). For example, even when the vehicle has entered a downhill road, since this slope surface gradually changes, the actual vehicle speed can be controlled to the target speed Vt with high response, namely to such an extent as to somewhat increase or decrease from this prescribed deviation. Accordingly, if the deviation between the target speed Vt (or stored vehicle speed Vm) and the actual vehicle speed Vn is set to be a speed which is approximately a deviation less likely to occur during the ordinary constant speed travel control process, it is usually less likely that such a speed state occurs. Accordingly, this state can be considered as being on a very steep downhill road, or an abnormality of the motor $22a$, connection members such as the clutch $22b$, or throttle valve 26, if it has occurred.

That is, the state wherein the actual vehicle speed Vn has increased by the prescribed speed P from the target speed Vt is deemed as a speed abnormality of the vehicle whereupon abnormality detection of the control mechanism such as the clutch $22b$, throttle valve 26, etc. is carried out.

As the abnormality detecting method, when the above-mentioned increased-speed abnormality has occurred during the constant speed travel control process, it is examined whether or not the actuator can be controlled so that the throttle valve becomes fully closed, to thereby detect the abnormality of the control mechanism such as the motor, clutch, etc. Accordingly, as mentioned above, when the prescribed speed P is set to be a small value so as to perform the above-mentioned abnormality detection during even the ordinary constant speed travel control process such as in case of the level road, the vehicle speed is rapidly decreased because of controlling the throttle valve to the side where it is fully closed. However, so long as the vehicle is running on the downhill road, even when the throttle valve 26 has been fully closed, it does not happen that the vehicle speed abruptly decreases owing to gravitational acceleration causing an increase in the vehicle speed. Accordingly, no feeling of discomfort is given to the passengers.

That is to say, according to this embodiment, there can be obtained by setting the prescribed speed P as mentioned above the effect of enabling diagnosis of the control mechanism even when the control mechanism of the constant speed travel control such as the motor is operating normally (merely a case of abnormal vehicle speed in the course of travel or the downhill road) during the constant speed travel control process without being accompanied by an abrupt decrease in the vehicle speed, i.e., without giving to the passengers a feeling of discomfort due to abrupt deceleration.

Next, the resume process will be explained. The resume process is that wherein, when the resume switch $14b$ has been depressed when the stored vehicle speed Vm was previously set and the vehicle is not in constant speed travel control operation, the vehicle speed is resumed from the present vehicle speed up to the stored vehicle speed Vm.

Firstly, in step 104 in FIG. 2, the determination of "NO" is made with the result that the operation subsequently proceeds to the process in step 200. If in step 201 in FIG. 3 the set switch $14a$ is "off", it is determined whether or not the resume switch $14b$ is "on" (step 208). If the resume switch $14b$ is "on" and further the stored vehicle speed Vm is not zero, i.e., the stored vehicle speed Vm is set (step 209), then the present vehicle speed Vn is set to be the target speed Vt (step 210). Then, the clutch $22b$ is made "on" and the flag FRES that indicates the resume control process is being executed is made "on" (step 210). Thereafter, the processes 105, 500, and 106 are executed.

In the next control period, the determination "YES" is made in step 104 with the result that the operation proceeds to step 108 and to step 109 and then to step 400. Thereafter, in step 401 in FIG. 4, the determination "NO" is made and then it is determined whether or not the resume control process is being executed (step 403). Namely, the "on" determination of the flag FRES is made. In step 403, the determination "YES" is made with the result that the target speed Vt is increased by D (step 404). Then, it is determined whether or not this target speed Vt is higher than the stored vehicle speed Vm (step 405). If $Vt \leq Vm$, then the processes in steps 105, 500, and 106 are executed. Accordingly, so long as $Vt \leq Vm$, the processes in steps 105, 500, and 106 are executed while the target speed Vt is being increased little by little, to thereby cause an increase in the vehicle speed Vn. If the condition of $Vt > Vm$ has been met as a result of the rise in the target speed Vt, the stored vehicle speed Vm is set as the target speed Vt and the flag FRES is made "off" (step 406).

In the next control period, the determination "NO" is made in step 403. Since the resume switch $14b$ is already released, the determination "NO" is made in the resume-switch $14b$ "on" determination process in the next step 407. Then, in the "on" determination of both the flag FACC and the flag FCOA, a "NO" determination is made with the result that the flag FSET is made "off" (step 409) and subsequently the processes in steps 600, 105, 500, and 106 are executed. That is, the operation performs the constant speed travel control process.

Next, the acceleration process will be explained. The acceleration process is such that, when the resume switch $14b$ has been depressed during the constant speed travel control process, speed-up control is performed whereupon the constant speed travel control is caused with the vehicle speed Vn which prevails when the resume switch $14b$ has been released being set to be the target speed Vt. Firstly, it is determined in step 104 that the constant speed travel control process is being executed. Then, the operation proceeds to step 108 and to step 109 and then to step 400. Then, the operation proceeds from step 401 to step 403. When in this step 403 it has been determined that the resume control process is not being executed, the "on" determination of the resume switch $14b$ in step 407 is made as the determination "YES" if the resume switch $14b$ is depressed to be "on". As a result, the target speed Vt is increased by the constant speed value D and the flag FACC which indicates that acceleration control is being executed is made "on" (step 410). Thereafter, in the succeeding process of step 500, the drive duty for driving the motor $22a$ is calculated using the D-increased target speed Vt, thereby controlling the vehicle speed Vn so as to cause it to become equal to the D-increased target speed Vt. As a result, the speed-increasing control is achieved. So long as the resume switch $14b$ continues to be depressed, the target speed Vt increases until a prescribed speed such as a legal speed as the upper limit. Thus, the vehicle speed Vn continues to increase.

When the acceleration control process is terminated, the resume switch 14b is released. As a result of this release, the determination "NO" is made in step 407. Since in step 408 the flag FACC is being "on", the determination "YES" is made with the result that the present vehicle speed Vn is set to be the stored vehicle speed Vm and also be the target speed Vt. Further, each of the flags FACC and FCOA is made "off" (step 411). Thus, the operation proceeds to the constant speed travel control process.

Next, the coasting process will be explained. The coasting process is such that, when the set switch 14a has been depressed during the constant speed travel control process, speed-down control is performed whereupon, with the vehicle speed Vn that prevails when the set switch 14a has been thereafter released being set to be the target speed Vt, the operation proceeds to the constant speed travel control process. Firstly, in step 104, it is determined that the constant speed travel control process is being executed. Then, the operation proceeds to step 108 and to step 109 and then to step 400. Then, in step 401, it is determined that the set switch 14a is "on". Since in step 409 the flag FSET is already made "off", the determination "NO" is made in step 402, with the result that the fixed duty signal, e.g., 30% for driving the motor 22a toward the side of decreasing the actuator opening is outputted. In addition, the flag FCOA which indicates that the coasting control process is being executed is made "on" (step 412). Then, after the duty outputting process in step 106 has been executed, the operation proceeds to the next control period. The reason why the "on" determination of the flag FSET is made in step 402 is for discriminating between the "on" operation of the set switch 14a in the setting operation and the "on" operation of the set switch 14a for executing the coasting control process.

When terminating the coasting control process, the set switch 14a is released with the result that the operation proceeds from step 401 to step 408 via step 403 and then via step 407. Since in this step 408 the flag FCOA is "on", the operation next proceeds to step 411 where the present vehicle speed Vn is set to be the stored vehicle speed Vm and also be the target speed Vt. In addition, the flag FACC and the flag FCOA are each made "off" (step 411). Thus, the operation proceeds to the constant speed travel control process.

As illustrated in FIGS. 13(a1) to 13(a3), when there occurs an override wherein a driver depresses the accelerator pedal 28 during the constant speed travel control process to cause an increase in the vehicle speed, or when the vehicle goes onto a descending slope, there may be a case wherein the vehicle speed Vn increases to an appreciably large extent as compared with the stored vehicle speed Vm (or target speed Vt) (time t1 and thereafter). At this time, according to this embodiment, through the execution of the constant speed travel control process in step 500 and in step 106, the motor 22a is immediately rotated to the side of decreasing the actuator opening AO to thereby decrease this actuator opening so as to decrease the opening of the throttle valve 26. If the motor 22a is not locked, the following processing operations are performed. Namely, when in this non-locked state it has been determined in step 610 that the speed Vn of the vehicle is higher than the reference speed (Vm+P) (time t3), since the actuator opening is already fully closed by the above-mentioned constant speed travel control process and also the above-mentioned prescribed connection members are making the first limit switch 23b open, the motor 22a is in its "motor open (MO)" state with the result that the determination "YES" is made in step 620, the operation then proceeds to the ordinary constant speed travel control process.

Also, if a small value has been adopted as the value of the prescribed speed P or if the vehicle speed Vn has appreciably risen sharply, the following processing operations are executed. Namely, as illustrated in FIGS. 13(b1) to 13(b3), when in such a case it has been judged in step 610, before the actuator opening is fully closed, that the speed Vn of the vehicle is higher than the reference speed (Vm+P) (time t12), the determination "NO" is made in step 620. Then, the operation proceeds to step 630 and also to step 640 and then to step 650 where the actuator opening rapidly decreases. As a result, after it has been determined in step 610 that Vn>Vm+P and before Q seconds elapse (time t13), the actuator opening becomes fully closed with the result that the connection members make the first limit switch 23b open. As a result, the motor falls in the "motor open" state and the determination "YES" is made in step 620, the operation returning to the ordinary constant speed travel control process.

If the motor 22a is locked, the following processing operations are executed. Namely, as illustrated in FIGS. 13(c1) to 13(c3), even when in such a case an override occurs or the vehicle goes down the downhill road (time t21 and thereafter), no change in the actuator opening occurs because the motor 22a does not rotate despite the electric current control of the actuator driving stage 7. Thus, Vn>Vm+P is established with the result that the determination "YES" is made in step 610 (time t22). Further, even after the elapse of Q seconds (time t23), the actuator opening does not change. Accordingly, the determination "YES" is made in step 640, whereupon the operation proceeds to the cancellation process (step 700). Thus, the execution of the constant speed travel control process is stopped. In the cancellation process (step 700), since the clutch 22b is disconnected (step 701), the connection members are returned to their pre-operation positions. As a result, the actuator opening becomes zero, i.e., becomes fully closed (time t24). Therefore, the first limit switch 23b is made open, with the result that the motor 22a assumes the "motor open" state. As a result, the vehicle speed Vn starts to decrease from the time t23. Particularly, as described later, by informing to the driver of abnormality of the constant speed travel control by means of an alarm lamp, he can quickly operate the accelerator pedal 28 and can promptly cope with such an abnormality.

Since this embodiment is constructed as mentioned above, when electric current input to the motor 22a is being detected by the electric current sensor 13 even after the time period in which it is being continuously determined that the speed Vn of the vehicle is higher than the reference speed (Vm+P) has elapsed for a prescribed time period, it can be determined that the motor is locked. By this construction, even if no potentiometer or the like is provided on the actuator 22, it results that the state of motor unrotatability can be detected.

Further, as mentioned above, since when the motor has been determined to be in the state of unrotatability the constant speed travel control is stopped by the cancellation process in step 700, this constant speed travel control process can be ended with safety.

Even when a fuel cut-off surge occurs upon entry into the downhill road, since the fluctuation period of the vehicle speed is enlarged, passenger comfort does not deteriorate.

In the cancellation process (step 700) according to this embodiment, the clutch 22b was made "off" (step 701), the target speed Vt was cleared to zero (step 702) and the motor 22a was continuously energized to the side of decreasing the actuator opening (step 703) to thereby stop the execution of the constant speed travel control process.

Figure 10:
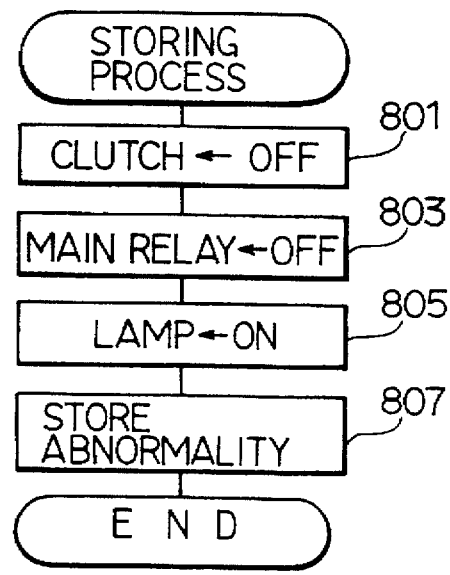
FIG. 10 is a flow chart illustrating another cancellation process in the motor lock detection process.

However, in place of this, the process in FIG. 10 may be executed by providing an alarm lamp which is controllable by the microcomputer 8. That is, the clutch 22b is made "off" (step 801), the main relay 9 is made "off" (step 803), the alarm lamp is turned on (step 805), and further the abnormality of the motor lock is stored in a backup RAM not illustrated (step 807).

As a result, it is possible to inform the driver by the alarm lamp that the constant speed travel control operation has become impossible due to the unrotatability of the motor, whereby he can thereafter appropriately take prompt countermeasures. Also, since the determination of the motor having been locked is stored in the backup a, previous occurrence of abnormality is checked when inspection is later performed after some feeling of abnormality or when periodic inspection is performed. Thus, more appropriate and efficient repair becomes possible. Also, by "on" operation of the main relay 9, the power source for executing the constant speed travel control process is cut off to thereby stop the supply of electric current to the actuator driving stage 7. This more reliably ensures safe termination of the constant speed travel control process.

In the above-mentioned construction, the process in step 805 corresponds to the process executed as the alarm means, the process in step 807 corresponds to the process executed as the abnormality storing means, and the process in step 803 corresponds to the process executed as the power source cutting-off means. In step 805, in place of using an alarm lamp, an alarm sound may be generated with the use of a buzzer, or an alarm lamp and a buzzer may both be used.

Although in step 610 of the above-mentioned embodiment the speed Vn of the vehicle and the reference speed (Vm+P) were compared with each other, the skip vehicle speed Vsk may be used in place of the speed Vn of the vehicle. Also, the target speed Vt may be used in place of the stored vehicle speed Vm.

In the above-mentioned embodiment, although the dead zone only on the side of decreasing the throttle opening was widened as illustrated in the map of FIG. 12, conversely the dead zone only on the side of increasing the throttle opening may be widened. By this widening, it is possible to permit greater speed reduction than in the case of a prescribed speed-reduction value to thereby prolong the cyclic period of the fuel cut-off surge. Further, the dead zone on both sides may be widened, whereupon the fluctuation period of the vehicle speed is more prolonged.

While the process in step 503 means the condition under which there is a high possibility that fuel cut-off is done, the fuel cut-off condition itself may be processed. Also, if another fuel cut-off condition is adopted in the electronic control fuel injection device 30, that condition or a condition close thereto is processed.

Also, although in the above-mentioned embodiment the value (Vt−Vsk), i.e., the value obtained by subtracting from the target speed Vt the vehicle speed which will be reached upon elapse of the time Tsk was used as the deviation, the value (Vt−Vn) may also be used, or a value obtained by further applying a constant to the value (Vt−Vn) may be used, as the deviation.

Also, in step 507, even a process with no map on the throttle-opening decreasing side, i.e., even a process which inhibits the output signal on the throttle-opening decreasing side may be executed. In this case, the fluctuation in the vehicle speed and the throttle opening illustrated in FIGS. 14(a) and 14(b) are as indicated by broken lines.

Also, delaying the timing for controlling the throttle opening in the map of FIG. 12 may be realized not only by widening the dead zone but also by decreasing the whole duty which is set in corresponding relation to the deviation. Also, such delaying may be also realized by making smaller the change in duty with a change in the deviation, i.e., the gradient of the map G2.

The present invention is not limited to the above-described embodiment and several modifications thereof but may be modified in many other ways without departing from the spirit of the invention.

What is claimed is:

1. An abnormality detecting system for a control mechanism which performs a constant speed travel control, said system comprising:

vehicle speed detecting means for detecting a speed of a vehicle;

control means having a driving force controlling mechanism for controlling a driving force of an engine of the vehicle, and a motor for driving the driving force controlling mechanism;

constant speed travel controlling means for, on the basis of a deviation between the speed of the vehicle detected by the vehicle speed detecting means and a target speed, controlling the motor so as to reduce the deviation of the detected speed from the target speed and thereby controlling the driving force of the engine by way of the driving force controlling mechanism;

electric current detecting means for detecting an electric current supplied to the motor;

electric current cutting means for cutting an electric current input to the motor when the driving force controlling mechanism has been controlled to a minimum driving-force state;

excess speed state determining means for determining whether or not the speed of the vehicle detected by the vehicle speed detecting means is higher than a reference speed which is higher than the target speed;

driving force minimization controlling means for, when it is being determined by the excess speed state determining means that the detected speed of the vehicle is higher than the reference speed, rotating the motor and thereby controlling the driving force controlling mechanism to the minimum driving-force state; and abnormality determining means for determining that the control mechanism is abnormal when the electric current to the motor is being detected by the current detecting means for more than a time period during which it is being continuously determined by the excess speed state determining means that the speed of the vehicle is higher than the reference speed.

2. The abnormality detecting system according to claim 1, wherein:

the abnormality determining means determines that a state of rotation of the motor is abnormal.

3. The abnormality detecting system according to claim 1, wherein the electric current cutting means comprises: switching means provided on an electric current flow-in path to the motor for cutting off the electric current flow-in path to the motor when the driving force controlling mechanism has been controlled to the minimum driving-force state.

4. The abnormality detecting system according to claim 1, further comprising:

constant speed travel control cancellation means for, when it has been determined by the abnormality determining means that the motor rotation state is abnormal, cancelling the control performed by the constant speed travel controlling means.

5. The abnormality detecting system according to claim 1, further comprising:
   alarm means for generating an alarm when it has been determined by the abnormality determining means that the motor rotation is abnormal.

6. The abnormality detecting system according to claim 1, further comprising:
   abnormality storing means for, when it has been determined by the abnormality determining means that the motor rotation is abnormal, storing that a determination that the motor is abnormal has been made.

7. The abnormality detecting system according to claim 1, further comprising:
   power source cutting means for, when it has been determined by the abnormality determining means that the motor rotation is abnormal, cutting off an electric power supply to the constant speed travel controlling means.

8. The abnormality detecting system according to claim 1, further comprising:
   power source cutting means for, when it has been determined by the abnormality determining means that the control mechanism is abnormal, cutting off an electric power supply to the constant speed travel controlling means.

9. The abnormality detecting system according to claim 1, further comprising:
   alarm means for generating an alarm when it has been determined by the abnormality determining means that the control mechanism is abnormal.

10. The abnormality detecting system according to claim 1, further comprising:
    abnormality storing means for, when it has been determined by the abnormality determining means that the control mechanism is abnormal, storing that a determination that the control mechanism is abnormal has been made.

11. The abnormality detecting system according to claim 1, wherein the excess speed determining means comprises:
    a vehicle speed sensor;
    an input buffer to receive a signal from the vehicle speed sensor; and
    a microcomputer to receive the signal from the vehicle speed sensor via the input buffer, the microcomputer including:
       a program executing within the microcomputer for comparing an actual vehicle speed, indicated by the signal from the vehicle speed sensor, with a reference speed contained within a memory of the microcomputer;
       the reference speed being a speed which is unlikely to occur during ordinary constant speed travel control.

12. The abnormality detecting system according to claim 1, wherein the driving force controlling means comprises:
    a first electric current input path on a normal side of the motor;
    a first diode electrically connected to the first electric current input path;
    a first limit switch arranged in parallel to the first diode;
    a second electric current input path on a reverse side of the motor;
    a second diode electrically connected to the second electric current input path; and
    a second limit switch arranged in parallel to the second diode.

13. The abnormality detecting system according to claim 1, wherein the constant speed travel controlling means comprises:
    a set switch;
    a resume switch;
    a cancellation switch;
    a vehicle speed sensor;
    a stop lamp switch;
    an idle switch;
    an input buffer to receive signals from the set switch, the resume switch, the cancellation switch, the vehicle speed sensor, the stop lamp switch, and the idle switch; and
    a microcomputer to receive the signals via the input buffer and to output a drive instruction to an actuator driving stage.

14. The abnormality detecting system according to claim 1, wherein the electric current curing means comprises:
    a limit switch.

15. The abnormality detecting system according to claim 2, further comprising:
    alarm means for generating an alarm when it has been determined by the abnormality determining means that the state of rotation of the motor is abnormal.

16. The abnormality detecting system according to claim 2, further comprising:
    abnormality storing means for, when it has been determined by the abnormality determining means that the state of rotation of the motor is abnormal, storing that a determination that the state of rotation of the motor is abnormal has been made.

17. The abnormality detecting system according to claim 2, further comprising:
    power source cutting means for, when it has been determined by the abnormality determining means that the state of rotation of the motor is abnormal, cutting off an electric power supply to the constant speed travel controlling means.

18. A method for detecting an abnormality in a vehicle speed control mechanism which includes an electric motor and controls the electric motor in a direction to reduce a deviation of an actual vehicle speed from a target vehicle speed, the method comprising steps of:
    detecting an excess speed condition in which the actual vehicle speed is higher than a reference speed which is higher than the target vehicle speed, the target vehicle speed being a desired vehicle speed which the vehicle speed control mechanism attempts to maintain;
    detecting an electric current supplied to the electric motor;
    rotating the electric motor in a direction such that the vehicle speed control mechanism is put into a minimum condition for reducing an output power of an engine of the vehicle when the excess speed condition is detected;
    cutting off the electric current to the electric motor when the vehicle control mechanism is put into the minimum condition; and
    determining an abnormality in the vehicle speed control mechanism when the electric current is detected by the step of detecting an electric current while the excess speed condition is being detected for more than a predetermined time period.

19. The method for detecting the abnormality in the vehicle speed control mechanism according to claim 18, further comprising a step of:

canceling control of the vehicle speed control mechanism when the step of determining the abnormality in the vehicle speed control mechanism determines the abnormality.

20. The method for detecting the abnormality in the vehicle speed control mechanism according to claim 18 further comprising a step of:

generating an alarm when the step of determining the abnormality in the vehicle speed control mechanism determines the abnormality.

21. The method for detecting the abnormality in the vehicle speed control mechanism according to claim 18, further comprising a step of:

storing a determination that the electric motor is abnormal when the step of determining the abnormality in the vehicle speed control mechanism determines the abnormality.

22. The method for detecting the abnormality in the vehicle speed control mechanism according to claim 18, further comprising a step of:

cutting off an electric power supply to the vehicle speed control mechanism when the step of determining the abnormality in the vehicle speed control mechanism determines the abnormality.

23. The method for detecting an abnormality in the vehicle speed control mechanism according to claim 18, wherein:

the reference speed is a speed which is unlikely to occur during ordinary constant speed travel control.

24. An abnormality detecting system for a constant speed travel control, comprising:

vehicle speed detecting means for detecting a speed of a vehicle;

control mechanism comprising:
- a driving force controlling mechanism for controlling a driving force of an engine of the vehicle,
- a power transmission mechanism enabling a transmission of power to the driving force controlling mechanism, and
- a motor for driving the driving force controlling mechanism through the power transmission mechanism;

constant speed travel control means for, upon receipt of a constant speed travel control instruction, making the power transmission mechanism able to transmit power to the driving force controlling mechanism and based on a deviation between the speed of the vehicle detected by the vehicle speed detecting means and a target speed controlling the motor so as to reduce the deviation and thereby controlling the driving force of the engine by way of the power transmission mechanism and the driving force controlling mechanism;

electric current detecting means for detecting an electric current supplied to the motor;

electric current cutting means for cutting off electric current input to the motor when the power transmission mechanism has been controlled to a minimum power transmission state;

excess speed state determining means for determining whether or not the speed of the vehicle detected by the vehicle speed detecting means is higher than a reference speed obtained by adding to the target speed a speed substantially the same as a deviation which, during a state of control wherein the speed of the vehicle is controlled to a speed substantially equal to the target speed, is unlikely to occur during an ordinary constant speed travel control;

driving force minimization controlling means for, when it is being determined by the excess speed state determining means that the speed of the vehicle is higher than the reference speed, rotating the motor and thereby controlling the power transmission mechanism to the minimum power-transmission state; and abnormality determining means for determining that the control mechanism is abnormal when electric current is being detected by the electric current detecting means when it is being determined by the excess speed state determining means that a state wherein the speed of the vehicle is higher than the reference speed continues for a prescribed time period, the prescribed time period corresponding to a time period required until the power transmission mechanism is controlled by the driving force minimization controlling means to the minimum power-transmission state.

* * * * *